(12) United States Patent
Uchacz et al.

(10) Patent No.: US 12,367,461 B2
(45) Date of Patent: Jul. 22, 2025

(54) TRACKING SOURCES OF AFTER-HOURS ACTIVITY BASED ON EVENTS MANAGED VIA AN ELECTRONIC COMMUNICATION APPLICATION

(71) Applicant: Microsoft Technology Licensing, LLC, Redmond, WA (US)

(72) Inventors: Jessalynn Uchacz, Seattle, WA (US); Aaron James Harrison, Rexburg, ID (US); Brian S. Ruble, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 18/367,298

(22) Filed: Sep. 12, 2023

(65) Prior Publication Data
US 2023/0419268 A1      Dec. 28, 2023

Related U.S. Application Data

(62) Division of application No. 17/556,470, filed on Dec. 20, 2021, now Pat. No. 11,783,297.

(51) Int. Cl.
*G06Q 10/107* (2023.01)
*G06Q 10/1091* (2023.01)
*G06Q 10/1093* (2023.01)

(52) U.S. Cl.
CPC ....... *G06Q 10/107* (2013.01); *G06Q 10/1091* (2013.01); *G06Q 10/1095* (2013.01); *G06Q 10/1097* (2013.01)

(58) Field of Classification Search
None
See application file for complete search history.

(56) References Cited

U.S. PATENT DOCUMENTS

2021/0374030 A1\* 12/2021 Guo ............... G06Q 10/063

\* cited by examiner

*Primary Examiner* — Tonia L Dollinger
*Assistant Examiner* — Ishrat Rashid
(74) *Attorney, Agent, or Firm* — RAY QUINNEY & NEBEKER; Tiffany B. Healy

(57) ABSTRACT

Methods and systems for tracking sources of after-hours activity based on events managed via an electronic communication application. One method includes accessing a log storing time information, receiver information, and originator information of an event managed via the electronic communication application, determining, based on the receiver information, a predetermined after-hours period of a receiver of the event, determining, based on the originator information and stored organizational data, an organizational group of an originator of the event, and determining, based on the time information, whether the event occurred during the predetermined after-hours period of the receiver. The method also includes, in response to determining that the event occurred during the predetermined after-hours period of the receiver, adding a value to an after-hours count associated with the organizational group of the originator, and modifying operation of the electronic communication application as used by at least one user included in the organizational group.

20 Claims, 10 Drawing Sheets

TRACKING SOURCES OF AFTER-HOURS ACTIVITY BASED ON EVENTS MANAGED VIA AN ELECTRONIC COMMUNICATION APPLICATION

CROSS REFERENCE TO RELATED APPLICATIONS

This application is a Divisional of U.S. application Ser. No. 17/556,470, filed Dec. 20, 2021, which is incorporated herein by reference in its entirety.

FIELD

Implementations described herein generally relate to tracking events managed via an electronic communication application, such as, for example, electronic communications, meetings, tasks, calls, and the like, to identify a source of after-hours activity. In some implementations, in response to identifying a source of after-hours activity, the operation of the electronic communication application is modified to mitigate or prevent after-hours activity. In other implementations, one or more interactive reports or user interfaces are generated based on the sources of after-hours activity and associated tracked information.

SUMMARY

Within many organizations, users generally have a predefined set of work hours, such as, for example, 9 AM to 5 PM. The period of time outside of these work hours is generally referred to as an "after-hours" period. Users, however, sometimes work during an after-hours period, such as, for example, reading emails, responding to emails, attending meetings, or the like. In some situations, users voluntarily choose to work during an after-hours period. However, in other situations, activity by a different user triggers the user's activity during an after-hours period activity. For example, a first user may send an email to a second user during the second user's after-hours period, which may cause the second user to work during the after-hours period. Similarly, a first user may schedule a meeting with a second user, wherein at least a portion of the meeting occurs during the second user's after-hours period.

Measuring after-hours activity from the point of view of the users working during his or her after-hours period puts the onus of change on the users working during the after-hours period and fails to identify or address what is triggering these users to work during their after-hours period. Accordingly, to provide improved analytics and tracking within an electronic communication application, implementations described herein track events managed via the electronic communication application to identify a source of after-hours activity. With this information, operation of the electronic communication application may be modified for the identified source to improve efficiency and computing resource usage. For example, system maintenance may occur during after-hours periods, which may cause latency or disconnection issues that impact the efficient use of computing resources during an after-hours period. Also, activity occurring during after-hours periods may use less efficient devices, networks, or systems (for example, a home Internet connection) as compared to activity occurring during work hours. Accordingly, working during an after-hours period is often less efficient in terms of user resources and computing resources. Thus, mitigating or preventing after-hours activity results in improved efficiency in terms of user time as well as computing resource usage.

In some implementations, one or more novel user interfaces may also be generated that provide information regarding tracked events and identified sources of after-hours activity. The user interfaces may be interactive and may execute various filters on data provided within the user interface based on user input. In particular, rather than merely considering a flat database of event information, event information may be linked with user information to create a multi-dimensional model that allows for efficient filtering of data. This multi-dimensional model provides efficient data filtering and analysis (both in terms of computing resource usage and user interaction and ease of use) at levels not available through flat file approaches. In particular, the multi-dimensional model described herein is a dynamic data model that actively draws on linked tables (for example, person-to-person and meeting-to-attendee tables) to filter on both sides of an after-hours event (a user causing the event and a user effected by event) while avoiding laborious queries and data processing to identify sources of after-hour activity by organizational groups or other user or organizational parameters.

For example, electronic communication applications generate logs tracking events managed via the electronic communication application. Implementations described herein use data stored in such logs to identify after-hours activity by a receiver of an event and the source or originator of event. For example, implementations described herein use data in one or more logs to identify an email sent during a defined after-hours period of a recipient of the email, meetings scheduled at a time overlapping with a participant's after-hours period, a task assigned a deadline falling within the assignee's after-hours period, or the like. These originating sources are cross-referenced with stored organizational data to group originating sources by department, title, location, or other source parameters. Accordingly, by creating a multi-dimensional model including both events, sources, and source parameters (for example, department, title, seniority, and the like), sources of after-hours activity may be grouped based on varying source parameters. For example, using the multi-dimensional model, implementations described herein identify which organizational groups create the most after-hours activity and, optionally, modify operation of the electronic communication application for members of one or more organizational groups to mitigate after-hours work and improve overall user efficiency and computer resource usage.

For example, one implementation provides a system for operating an electronic communication application. The system includes a server including an electronic processor. The electronic processor is configured to access a log storing time information, receiver information, and originator information for an event managed via the electronic communication application, determine, based on the receiver information, a predetermined after-hours period of a receiver of the event, determine, based on the originator information and stored organizational data, an organizational group of an originator of the event, and determine, based on the time information, whether the event occurred during the predetermined after-hours period of the receiver of the event. The electronic processor is also configured to, in response to determining that the event occurred during the predetermined after-hours period of the receiver of the event, add a value to an after-hours count associated with the organizational group of the originator of the event and modify, based on the after-hours count, operation of the electronic communication application as used by at least one user included in the organizational group.

Another implementation provides a method of modifying operation of an electronic communication application. The method includes accessing, with an electronic processor, a log storing time information, receiver information, and originator information of an event managed via the electronic communication application, determining, with the electronic processor based on the receiver information, a predetermined after-hours period of a receiver of the event, determining, with the electronic processor, based on the originator information and stored organizational data, an organizational group of an originator of the event, and determining, with the electronic processor based on the time information, whether the event occurred during the predetermined after-hours period of the receiver of the event. The method also includes, in response to determining that the event occurred during the predetermined after-hours period of the receiver, adding, with the electronic processor, a value to an after-hours count associated with the organizational group of the originator, and modifying, based on the after-hours count, operation of the electronic communication application as used by at least one user included in the organizational group.

A further implementation provides non-transitory computer-readable medium storing instructions that, when executed by an electronic processor, perform a set of functions. The set of functions including accessing a log storing time information, receiver information, and originator information for each of a plurality of events managed via an electronic communication application, and, based on information stored in the log, generating a multi-dimensional model linking information regarding the plurality of events to organizational data regarding receivers and originators of the plurality of events. The set of functions also includes, based on the multi-dimensional model, determining, for each of a plurality of organizational groups, a performed after-hours count representing after-hours activity performed by members of each respective organizational group included in the plurality of organizational groups and, based on the multi-dimensional model, determining, for each of the plurality of organizational groups, a caused after-hours count representing after-hours activity caused by members of each respective organizational group included in the plurality of organizational groups. The set of functions further includes generating a graphical user interface based on the performed after-hours counts and the caused after-hours counts for the plurality of organizational groups, and, in response to receiving filtering criterion, modifying the graphical user interface based on the filtering criterion and the multi-dimensional model.

DETAILED DESCRIPTION

Figure 1:
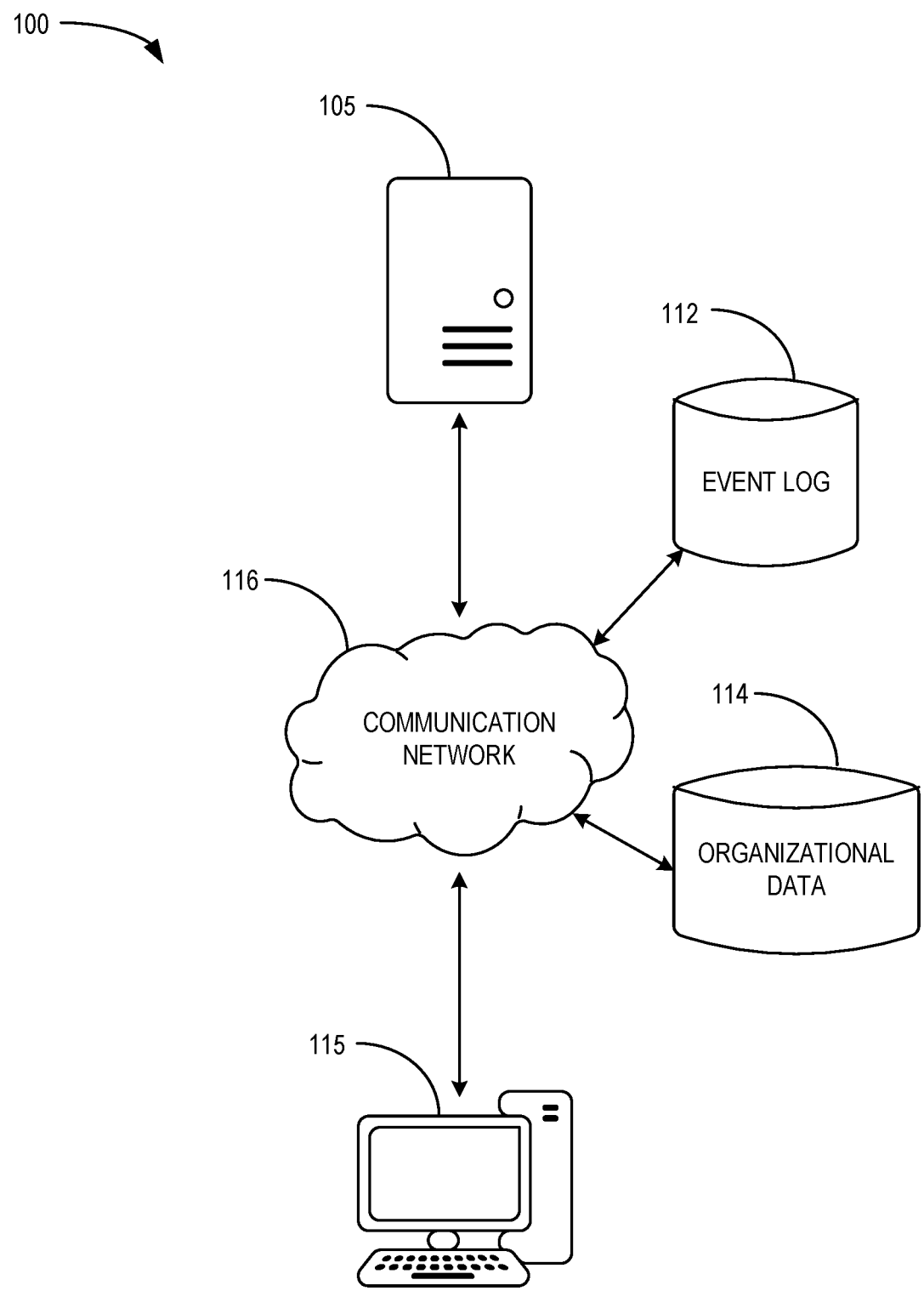
FIG. 1 schematically illustrates a system for tracking events managed via an electronic communication application according to some implementations.

One or more implementations are described and illustrated in the following description and accompanying drawings. These implementations are not limited to the specific details provided herein and may be modified in various ways. Furthermore, other implementations may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some implementations described herein may include one or more electronic processors configured to perform the described functionality by executing instructions stored in non-transitory, computer-readable medium. Similarly, implementations described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and may include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, implementations described herein provide methods and systems for identifying sources of after-hours activity by tracking events managed via an electronic communication application, such as, for example, Outlook® or Teams® provided by Microsoft Corporation, Gmail® or Google® Calendar provided by Google LLC, Calendar provided by Apple® Inc., Slack® provided by Slack Technologies, LLC, or the like. As noted above, as compared to focusing solely on identifying users engaging in after-hours activity, implementations described herein identify a source of after-hours activity. This information may be used to modify (in some implementations, automatically) operation of the electronic communication to prevent or mitigate after-hours activity. For example, warning features, delay features, prevention features, or a combination thereof available within the electronic communication application may be enabled for one or more users, such as users included in an organizational group creating a predetermined amount of after-hours activity. The information may also be used to generate various reports and insights within graphical user interfaces, which are interactive to allow a user to filter and drill down into sources of after-hours activity and opportunities for addressing such activity.

FIG. 1 schematically illustrates a system 100 for tracking events managed via an electronic communication application according to some implementations. The system 100 include a server 105, an event log 112, organizational data 114 (which may be stored in one or more databases or other data storage devices), and a user device 115. The server 105, the event log 112, the organizational data 114, and the user device are communicatively coupled via a communications network 116. The communications network 116 may a wired or wireless network and may be implemented using a wide area network (for example, the Internet), a local area network (for example, an Ethernet or Wi-Fi™ network), a cellular data network (for example, a Long Term Evolution (LTE™) network), and combinations or derivatives thereof. In some implementations, components of the system 100 communicate through one or more intermediary devices, such as routers, gateways, or the like (not illustrated).

The system 100 illustrated in FIG. 1 is provided as one example system and, in some implementations, the system 100 includes fewer or additional components in various configurations. For example, the event log 112, the organizational data 114, or a combination thereof may be distributed among a plurality of devices, such as a plurality of databases. Also, in some implementations, at least a portion of data stored in the event log 112, the organizational data 114, or a combination thereof is stored on the server 105. Also, in some implementations, more than one user device 115 communicates with the server 105. In addition, in some implementations, the system 100 includes additional servers. For example, the functionality described herein as being performed via the server 105 may be performed via a plurality of devices, such as a plurality of servers included in a hosted or cloud service environment.

The event log 112 stores data regarding events managed via an electronic communication application. The electronic communication application may include an application configured to provide electronic communication (including data sharing) between users, such as, for example, Outlook® or Teams® provided by Microsoft Corporation, Gmail® or Google® Calendar provided by Google LLC, Calendar provided by Apple® Inc., Slack® provided by Slack Technologies, LLC, or the like. As used herein, an "event" may include an electronic communication (for example, an email, an instant message, a text message), an audio call, a video call, a meeting, a task, or a combination thereof. Each event is associated with an originator and a receiver. For example, when the event is an email message, the sender is the originator, and the recipient is the receiver. Similarly, when the event is a meeting, an organizer of the meeting is the originator and a participant (or attendee when a participant attends the meeting) is the receiver. Accordingly, the terms "originator" and "receiver" as used herein are applicable to each type of event managed via the electronic communication application.

The event log 112 stores events managed by the electronic communication application, metadata regarding such events, or a combination thereof. Among other information, the event log stores time information for an event (for example, a sent time of an email or other electronic communication, a start time or an end time of a meeting, a duration of a meeting, a creation date for a task, a deadline for a task, or the like), originator information for the event (for example, a sender of an email or other electronic communication, an organizer of a meeting, an assigner of a task, or the like) originator, and receiver information of the event (for example, a receiver of an email or other electronic communication, a participant of a meeting, an assignee of a task, or the like). The originator information and the receiver information may include a unique identifier of a user, which represents a user account associated with the electronic communication application.

The organizational data 114 may be stored on one or more databases and includes information about users associated with an organization (for example, a business, a school, a community, a country, an agency, an affiliation, or the like). The stored information may include identifiers of users (for example, employees) included in an organization, user titles or roles, user locations, user departments or other categories, user start dates or associated seniority levels, or similar data.

The user device 115 includes a laptop computer, a desktop computer, a tablet computer, a mobile computer (such as, for example, a cellular phone or a smart watch), or the like. As described in more detail below, the user device 115 is configured to communicate with the server 105 over the communications network 116 to access various reports and user interfaces generated via the server 105 regarding tracked after-hours activity.

Figure 2:
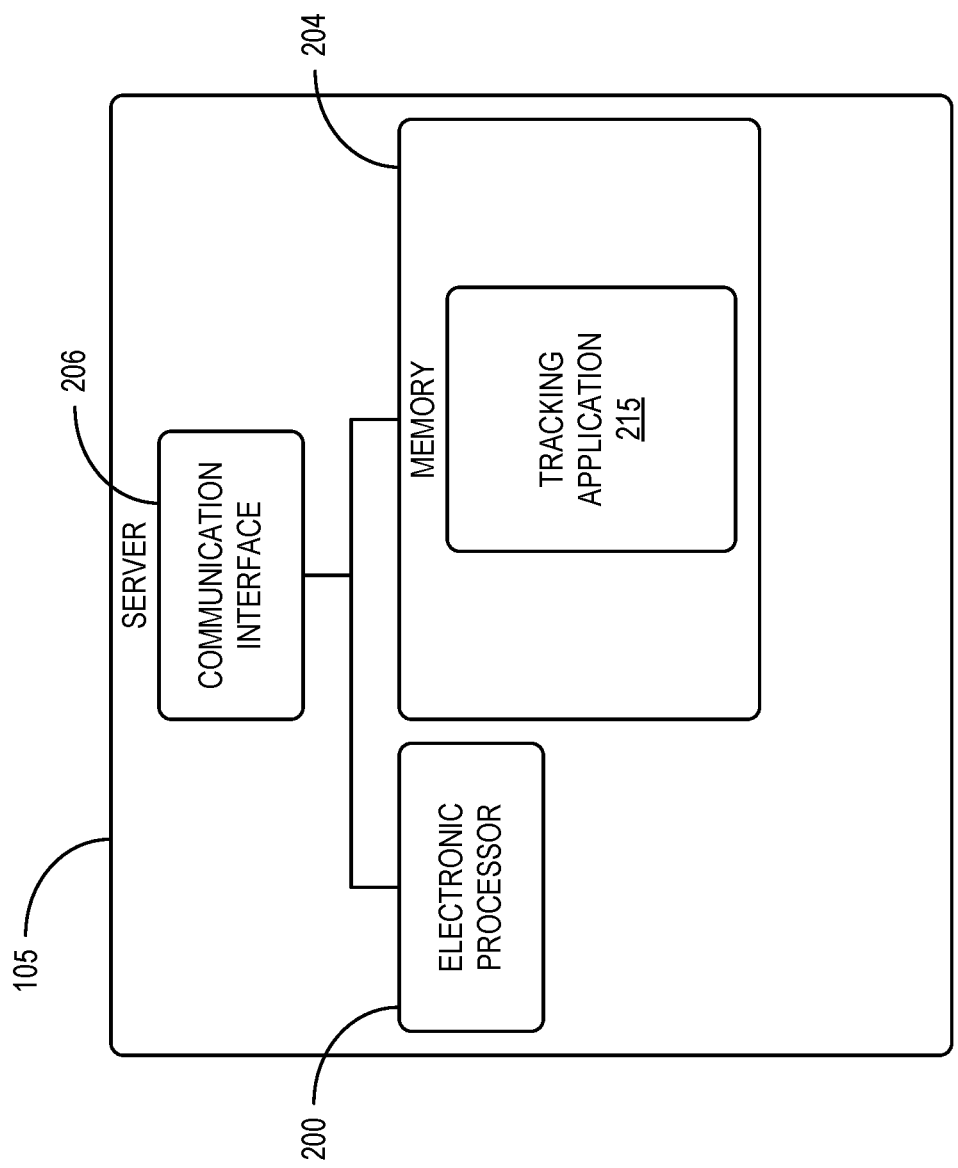
FIG. 2 schematically illustrates a server included in the system of FIG. 1 according to some implementations.

FIG. 2 is a block diagram of the server 105 according to some implementations. As illustrated in FIG. 2, the server 105 is a computing device (for example, a network-attached server) including an electronic processor 200 (for example, a microprocessor, application-specific integrated circuit (ASIC), or another suitable electronic device), a memory 204 (for example, a non-transitory, computer-readable storage medium), and a communication interface 206, such as a transceiver, for communicating over the communications network 116 and, optionally, one or more additional communication networks or connections. The server 105 may include additional components over those illustrated in FIG. 2 in various configurations and may perform other functionality in addition to the functionality described herein. Also, as noted above, functionality described herein as being performed by the server 105 may be distributed among multiple devices, such as multiple servers and may be provided through a cloud computing platform, accessible by components of the system 100 via the communications network 116. Also, although not illustrated or described herein for sake of brevity, the user device 115 may be structured similar to the server 105 and, in particular, may include one or more electronic processors, one or more memory modules, and one or more communication interfaces.

The electronic processor 200, the memory 204, and the communication interface 206 included in the server 105 are communicatively coupled wirelessly, over one or more wired communication lines or buses, or a combination thereof. The electronic processor 200 is configured to retrieve from the memory 204 and execute, among other things, software to perform the functionality described herein. For example, in the implementation illustrated in FIG. 2, the memory 204 includes a tracking application 208 configured to perform, when executed via the electronic processor 200, the functionality described herein. The memory 204 may store additional data and software. For example, in some implementations, the memory 204 also the electronic communication application described herein. It should be understood, however, that, in some implementations, the functionality described herein associated with the tracking application 208 is performed separate from the electronic communication application. It should also be understood that software stored in the memory 204 (or other memory modules included in the server 105) may be distributed and combined in various modules or units.

Figure 3:
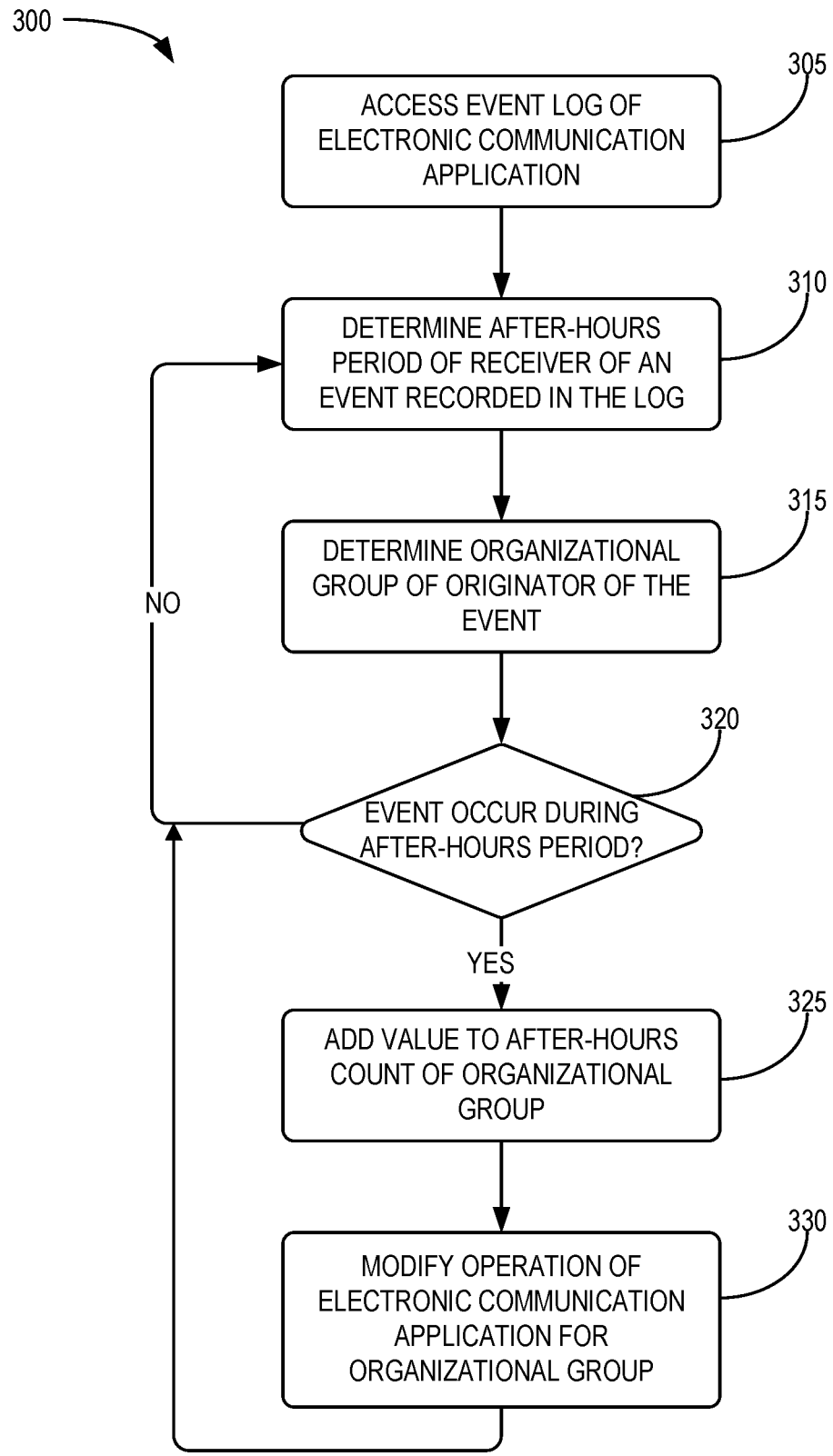
FIG. 3 is a flowchart illustrating of a method of tracking events exchanged via an electronic communication application according to some implementations.

FIG. 3 illustrates a method 300 performed by the server 105 (through execution of the tracking application 208 via the electronic processor 200). As illustrated in FIG. 3, the server 105 accesses the event log 112 for the electronic communication application (at block 305). As noted above, the event log 112 stores a data record for events managed via the electronic communication application. For an event recorded in the event log 112, the server 105 determines an after-hours period of a receiver of the event (at block 310). The server 105 may determine the after-hours period of the receiver by identifying the receiver of the event from the receiver information stored in the event log 112, determining a geographic location of the receiver, and determining the after-hours period based on the location. For example, after identifying the receiver of the event (using a unique identifier of the receiver included in the event log 112), the server 105 may access the organizational data 114 to determine a geographic location of the receiver (for example, by determining a home or office address or location stored in the organizational data 114) and may then access a list of predetermined after-hours period for the location. As one non-limiting example, when a receiver is located in Chicago, Illinois, the server 105 may set the receiver's after-hours period as 9 AM Central to 5 PM Central. In other implementations, the event log 112 may store location information for the receiver. Alternatively or in addition, a user may configure their after-hours period as part of configuring the system 100, the electronic communication application, or a combination thereof, which the server 105 may have access to.

As illustrated in FIG. 3, the server 105 also determines an organizational group of an originator of the event (at block 315). In some implementations, the server 105 determines the organizational group of the originator by determining the originator based on the originator information included in the event log 112 and then accessing the organizational data 114 to identify the organization group associated with the originator, such as, for example, the originator's department, region, category, level, branch, or other grouping or subset of the organization to which the originator belongs.

The server 105 also determines whether the event occurred during the after-hours period of the receiver (at block 320). The server 105 may perform this determination by comparing time information stored in the event log 112 for the event with the determined after-hours period of the receiver. Whether an event occurs during the after-hours period may be determined based on a type of the event. For example, when the event is an email, the event may "occur" during the after-hours period when the email was sent during the after-hours period. Similarly, when the event is a meeting, the event may "occur" during the after-hours period when the time of the meeting overlaps with the after-hours period (for example, at least one of a start time and an end time of the meeting falls within the after-hours period). When the event is a task, the event may "occur" during the after-hours period when the task is created during the after-hours period or when the task includes a deadline falling within the after-hours period.

When the event occurs during the after-hours period, the server 105 adds a value to an after-hours count of the organizational group of the originator (at block 325). The value may be an amount of time based on the type of the event, information regarding the event, an action performed by the receiver of the event, or a combination thereof. For example, the value may be a default predetermined amount, a value based on details of the events, or a value based on actions taken by the receiver. As one example, when the event is an email or other electronic communication, the value may be a predetermined default time associated with reading the email (for example, two minutes) or responding to the email (for example, five minutes) or an actual time taken by the recipient to read and respond to the electronic communication. When the event is a meeting, the value may be the duration of the meeting or the portion of the meeting that overlaps with the after-hours periods. When the event is a task, the value may be a predetermined default time (for example, 10 minutes) or an amount of time that a user engaged in activity associated with the task (for example, edited or created content) during the after-hours period. For example, the value may be set to an amount of time a user worked on a document or other content item before closing or otherwise marking the task complete.

As illustrated in FIG. 3, the server 105 performs the above after-hours tracking for multiple events recorded in the event log 112. Also, as an event may be associated with multiple receivers who may have different after-hours periods (for example, an email sent to a plurality of recipients), the server 105 performs the above after-hours tracking for each receiver associated with an event recorded in the event log 112. Accordingly, this process creates an after-hours count for each of a plurality of organizational groups representing a total amount of after-hours time caused by members of the organizational group. In some implementations, the above process is performed across different types of events (for example, meetings, emails, instant messages, calls, and tasks), which may be recorded in the same or different event logs. However, in some implementations, the server 105 may be configured to determine a separate after-hours count for each type of event, which provides further insight into not only a source of after-hours activity in the form of which users are causing such work but how the source is causing such work.

In some implementations, the server 105 also performs a similar process to identify and track after-hours activity of users, such as an amount of time members of an organizational group worked during after-hours periods. For example, similar to establishing an after-hours count for each organizational group representing a cause of after-hours activity (causal organizational groups), the server 105 may also be configured to establish an after-hours count for each organization representing a number of after-hours worked by members of the organizational group (effected organizational groups). In particular, in addition to determining whether an event occurred during an after-hours period of a receiver of the event as described above, the server 105 may be configured to determine whether an event occurred during an after-hours period of the originator.

When the event occurred during the after-hours period of the originator, the server 105 is configured to add a value to a second after-hours count to track after-hours activity performed by the organizational group of the originator. As described herein, a count representing after-hours activity caused by an organizational group is referred to as a caused after-hours count, and a count representing after-hours activity performed by an organizational group is referred to as a performed after-hours count. As described herein, these two counts may be used to identify which organizational groups are working during after hours (via the performed after-hours count) and also what organizational groups are causing this after-hours work (via the caused after-hours count).

It should be understood that the process described above for tracking after-hours activity and sources of the same may consider various attributes when identifying whether to add a value to a count associated with a particular organization. For example, for email and other types of electronic communication, the server 105 may be configured to add a value to a caused after-hours count only when the receiver read the communication, responded to or otherwise answered the communication, or performed some level of activity in response to the communication. Similarly, for meetings, the server 105 may be configured to add a value to a caused after-hours count only when the receiver attended the meeting. For tasks, the server 105 may be configured to add a value to a caused after-hours count only when the receiver updated the task (for example, closed a task or updated a status of a task) or performed activities during the after-hours period associated with the task. In addition, in some implementations, when adding values to counts as described above, the server 105 may not add a value to a count when a receiver is not employed or otherwise included in the same organization as the originator.

As illustrated in FIG. 3, in some implementations, the server 105 is configured to modify operation of the electronic communication application for one or more members of an organizational group (at block 330). For example, in some implementations, the server 105 may be configured to automatically modify operation of the electronic communication application in response to the after-hours count for an organizational group satisfying a predetermined threshold value. The predetermined threshold value is configurable (for example, by a system administrator associated with an organization) to account for goals or expectations of the organization and may vary for different organizational groups. Also, in some implementations, multiple predetermined threshold values may be used to identify how to modify operation of the electronic communication application (for example, what feature to enable). For example, an organizational group with a higher after-hours count may face a more dramatic modification as compared to an organizational group with a lower after-hours count. In some implementations, rather than automatically modifying operation, the server 105 may be configured to provide a recommendation of a modification, such as by sending an email, a notification, a pop-up, or the like, to a system administrator for the organization. The system administrator may approve or decline the recommendation to selectively implement the recommended modification. Also, in some implementations, the system administrator may modify the recommendation, such as by enabling a different feature than the recommendation feature or limiting the modification to a particular subset of users.

Possible modifications to the operation of the electronic communication application include, but are not limited to, enabling an after-hours warning feature, enabling a delay feature, enabling a prevention feature, or a combination thereof. The warning feature, when enabled, provides a warning to a user within the electronic communication application (for example, as a pop-up, notification, message, or alert) when the user is engaging in an activity associated with a time that falls within the after-hours period of a receiver (for example, composing or attempting to send an email during the after-hours period of a recipient, scheduling a meeting during the after-hours period of a participant, or the like). In some implementations, the warning may also suggest a different time for the activity and may include one or more selection mechanisms (for example, buttons, hyperlinks, or the like), wherein, when the user selects one of the selection mechanisms, the electronic communication application may automatically modify the time of the activity.

The delay feature automatically delays or modifies an activity to a time that does not conflict (or conflicts less) with the after-hours period of a receiver. For example, when the activity is an email, the delay feature may automatically delay sending of the email to a time when it will be received by the recipient during the recipient's work hours. In some implementations, the electronic communication application may be configured to alert the originator of the delay (for example, through a message, pop-up, notification, or the like) and may provide the originator with an option to cancel the delay or further modify the time delay or time modification.

The prevention feature automatically prevents an originator from taking an activity conflicting with the after-hours period of a receiver. For example, when the activity is a meeting and the prevention feature is enabled, the electronic communication application is configured to automatically prevent an originator from sending an email, scheduling a meeting or the like, when this activity would conflict with the after-hours period of a receiver. As compared to the warning feature, in some implementations, the blocking or prevention implemented via the prevention feature may be maintained unless the originator manually modifies the time associated with the activity. Similar to the other features, the electronic communication application may notify the originator that the prevention feature has been enabled (for example, via a message, pop-up, alert, or other type of notification), and, in some implementations, the electronic communication application may block the originator from disabling the prevention feature. For example, in some implementations, only a system administrator may be authorized to disable the prevention feature or any of the features enabled as part of the activity tracking performed by the server 105. In other implementations, the server 105 may also be configured to disable a previously enabled feature in response to a reduction in the after-hours activity triggered by a particular organizational group (for example, in response to the after-hours activity dropping below the predetermined threshold that triggered the original enablement of the feature).

As noted above, modifying operation of the electronic communication application to mitigate or prevent after-hour activities addresses technical problems associated with after-hour activities and, thus, results in improved efficiency and computing resource usage. For example, maintenance may occur during after-hours periods, which may cause latency or disconnection issues that impact the efficient use of computing resources during after-hours. Also, activity occurring during after-hours periods may use less efficient devices, networks, or systems (for example, a home Internet connection) as compared to activity occurring during work hours. Accordingly, working during after-hours period may be less efficient in terms of user resources and computing resources and, thus, modifying operation of the electronic communication application to mitigate or prevent after-hours activity results in improved efficiency in terms of user time as well as computing resource usage.

As noted above with respect to FIG. 3, when processing the event log 112, the server 105 uses the stored organizational data 114 to effectively create a multi-dimensional model representing after-hours activity. Accordingly, rather than merely considering a flat file of events, the server 105 brings in organizational data, which improves the after-hours activity tracking and insights by making filtering more efficient and computationally possible.

Figure 4:
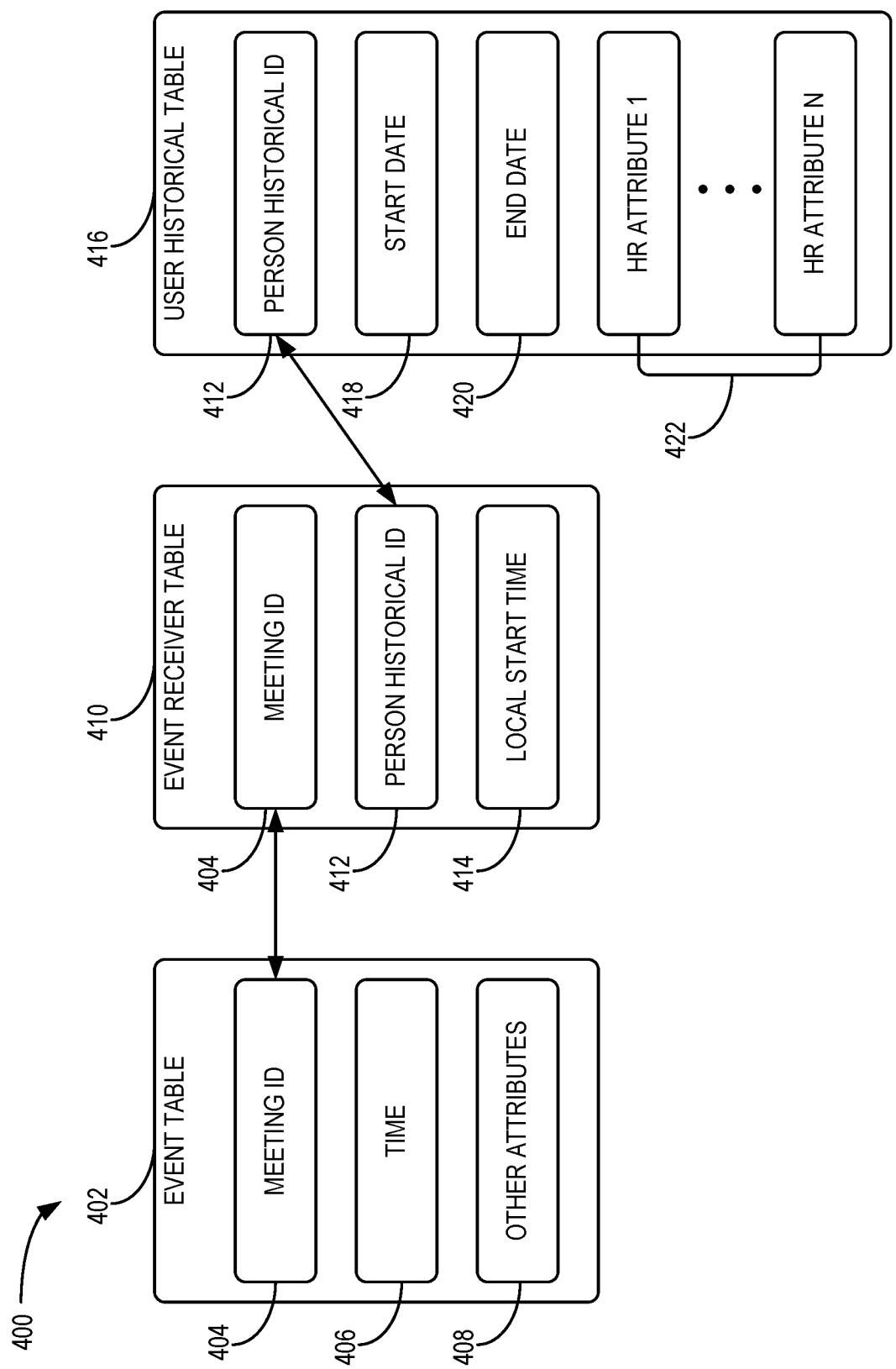
FIG. 4 illustrates a multi-dimensional model according to some implementations.

For example, FIG. 4 illustrates an example multi-dimensional model 400. The multi-dimensional model 400 illustrated in FIG. 4 relates to meetings. However, similar models may be used for other types of events, and, in some implementations, a single multi-dimensional model may include data associated with different types of events.

As illustrated in FIG. 4, the multi-dimensional model 400 combines an event table 402 (for example, a meeting table as illustrated in FIG. 4), an event user table 410 (for example, a meeting participant table), and a user historical table 416 (for example, a participant historical table as illustrated in FIG. 4). The event table 402, which, in some implementations, is pulled from the event log 112, includes information related to an event. For example, the event table 402 includes information for a meeting and, thus, includes a unique meeting identifier 404, time information 406 (for example, a start time, an end time, a duration, or a combination thereof), and one or more other meeting attributes (for example, a location of a meeting, a title or subject of the meeting, or the like). In the example of FIG. 4, the meeting identifier 404 links the meeting table 402 to the meeting participant table 410. The meeting participant table 410 stores information related to a specific participant of the meeting, such as the meeting identifier 404, a unique participant historical identifier 412, and time information 414. In some implementations, the time information includes a local time at which the meeting started for the specified participant.

As illustrated in FIG. 4, the participant historical identifier links the meeting participant table 410 to the participant historical table 416. The participant historical table 416 includes information regarding users associated with an organization (including the participants of meetings representing in the meeting participant table 410) and, thus, may include information included in the organizational data 114, such as, for example, a user's title, role, employment dates, group, level, branch, location, time zone, or other human resource (HR) data. For example, as illustrated in FIG. 4, in some implementations, the participant historical table 416 stores the participant historical identifier 412, a start date 418 (for example, a user's start date for the organization), an end date 420 (for example, a user's end data for the organization if applicable), and, optionally, one or more other HR attributes 422. The HR attributes 422 may include attributes of the participant with respect to the organization, such as, for example, location, time zone, organizational group, title, or the like.

As illustrated in FIG. 4, the linked tables used to create the multi-dimensional data 400 allow the server 105 to not just track which users are working during after-hours activity but to track which users are causing other users to work during after-hours (see method 300 described above). Also, the server 105 uses created multi-dimensional models to provide interactive user interfaces that allow a user to drill-down into tracked data, such as by organizational groups, levels or titles, regions, or the like. In particular, as noted above, generating a multi-dimensional model as described above creates a novel data structure that provides efficient data filtering and analysis (both in terms of computing resource usage and user interaction and ease of use) at levels not available through flat file approaches. In particular, the multi-dimensional model described herein is a dynamic data model that actively draws on linked tables (for example, person-to-person and meeting-to-attendee tables) to filter on both sides of an after-hours event (a user causing the event and a user effected by event) while avoiding laborious queries and data processing to identify sources of after-hour activity (for example, grouped by organizational groups or other parameters).

In some implementations, to use a generated multi-dimensional model through one or more interactive user interfaces, the user device 115 described above is configured to access the user interfaces generated via the server 105 through a dedicated application locally stored on the user device 115 or through a browser application stored on the user device 115. In some implementations where the tracking application 208 is incorporated into the electronic communication application, the user device 115 accesses the user interfaces through the electronic communication application. In other implementations, however, the user device 115 accesses the user interfaces through a separate application or portal.

Figure 5A:
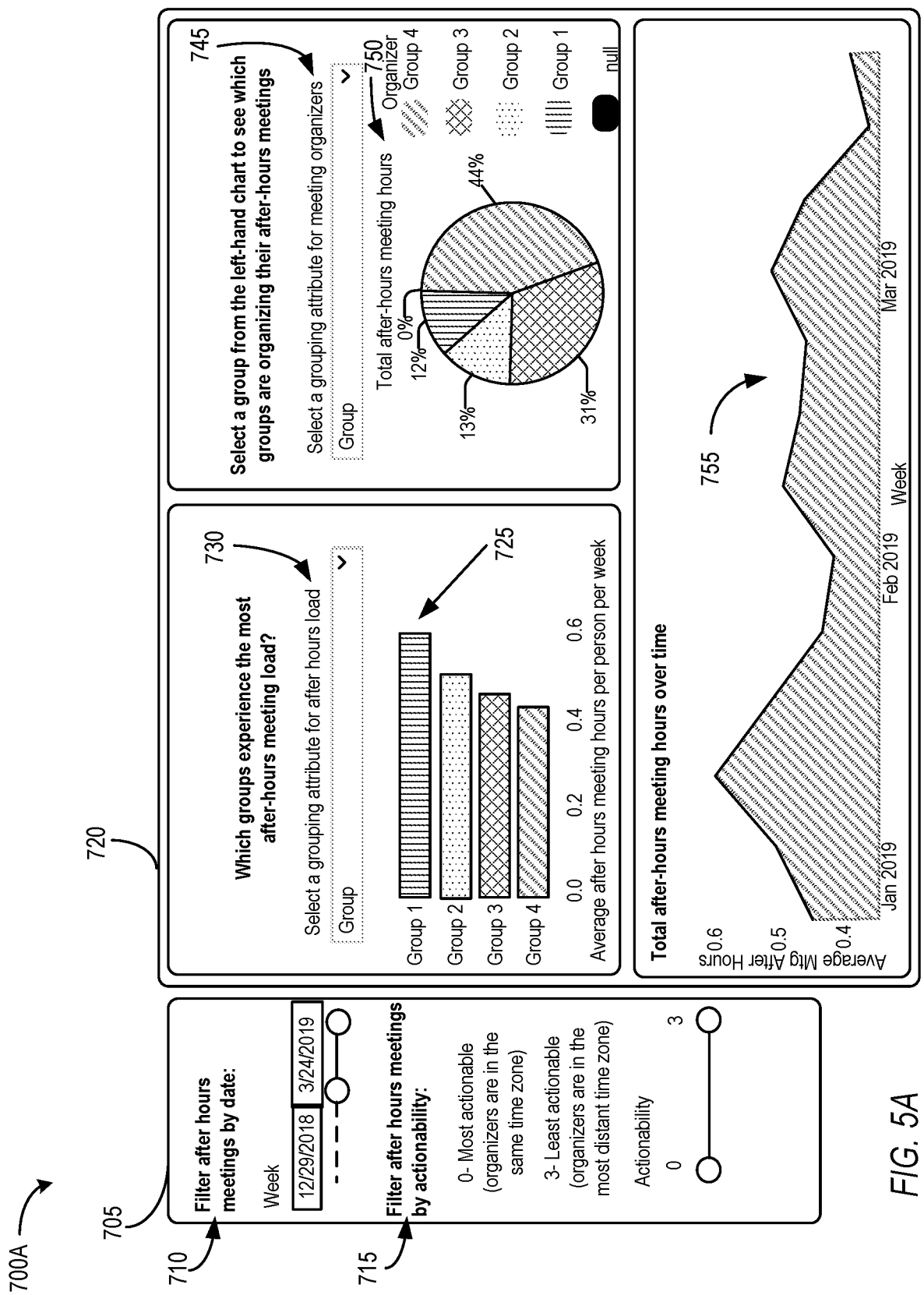
FIGS. 5A and 5B illustrate example user interfaces generated via the system of FIG. 1 according to some implementations.

FIG. 5A illustrates a graphical user interface (GUI) 700A generated via the server 105 according to some implementations. The GUI 700A includes a filtering panel 705 and an analytics panel 720. The filtering panel 705 includes a date input mechanism 710 for filtering after-hours activity by date (for example, via a text or input box, a slider, or a combination thereof) and an actionability input mechanism 715 for filtering after-hours activity by actionability (for example, via a text or input box, a slider, or a combination thereof). Actionability is a value corresponding to whether after-hours activity was avoidable. For example, after-hours activity occurring when the originator and the receiver are in the same time zone (or within a predetermined number of time zones apart) may be considered avoidable (and, hence, actionable) as the originator and receiver have at least some overlapping working hours. In contrast, when the originator and the receiver are in different time zones, the after-hours activity may be considered more unavoidable, as the originator and receiver may have limited overlapping working hours.

The analytics panel 720 includes one or more graphs relating to the after-hours activity. For example, as illustrated in FIG. 5A, in some implementations, the analytics panel 720 includes a bar graph 725 illustrating after-hours activity experienced by each of a plurality of organizational groups (for example, based on the performed after-hours counts determined for organizational groups as described above with respect to the method 300). In particular, the bar graph 725 includes a bar for each of a plurality of organizational groups, wherein each bar illustrates an average amount of after-hours activity per person per week for each organizational group. The analytics panel 720 also includes an attribute input mechanism 730 associated with the bar graph 725 for selecting an attribute by which organizational groups are determined (for example, by region, level of responsibility, department, job title, or the like).

The analytics panel 720 also includes a pie graph 750 illustrating after-hours activity caused by each of a plurality of organizational groups. In some implementations, the pie graph 750 is limited to after-hours activity caused by each of a plurality of organizational groups with respect to one selected organizational group, which may be selected through selection of a bar in the bar graph 725. For example, as illustrated in FIG. 5A, in response to receiving a selection of the bar associated with "Group 1" in the bar graph 725, this bar may be highlighted or marked in some way (for example, via a distinct color or other marking or animation) within the bar graph 725 and the pie graph 750 may provide information on organizational groups causing after-hours activity for the selected "Group 1" (for example, as percentages of total after-hours experienced by "Group 1"). As illustrated in FIG. 5, in some implementations, the analytics panel 720 also includes an attribute field 745 associated with the pie graph 750 for selecting an attribute for groupings represented within the pie chart 750 (for example, by region, level of responsibility, department, job title, or the like).

As illustrated in FIG. 5A, the analytics panel 720 also includes a line graph 755 illustrating a total amount of after-hours activity over a predetermined period of time. The line graph 755 may represent all after-hours activity for an entire organizational or may be limited to a particular organizational group or other grouping parameter.

Figure 5B:
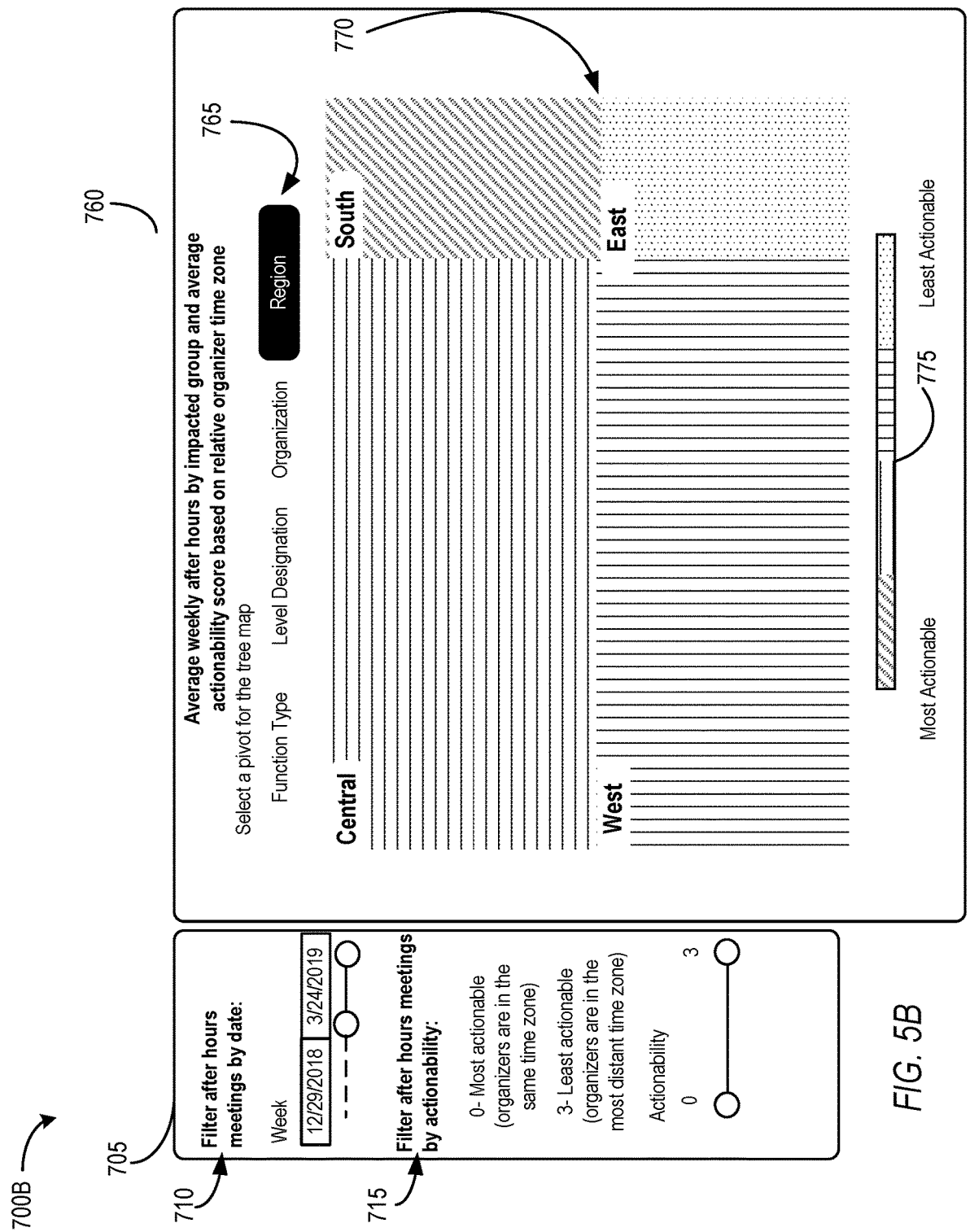

FIG. 5B illustrates a GUI 700B generated by the server 105 according to some implementations. The GUI 700B includes the filtering panel 705 as described above with respect to FIG. 5A. The GUI 700B also includes an actionability panel 760, which includes an actionability graph 770. The actionability panel 760 also includes a pivot selector 765 for selecting a pivot for the actionability graph 770. In some implementations, the actionability graph 770 includes a treemap illustrating a total or average amount of after-hours activity experienced by each of a plurality of groupings and an average actionability score based on relative originator time zone. For example, the actionability graph 770 as illustrated in FIG. 5B includes a plurality of boxes, wherein each box represents a particular grouping (for example, an organizational group, a function or event type, a level designation, a region, or the like as selected per the pivot selector 765), and the area of each box represents an amount of after-hours activity experienced by the respective grouping. A color, fill pattern, or other dimension of each box (other than area) also represents an actionability score associated with the after-hours activity. The actionability panel 760 further includes a scale 775 indicating a range of actionability scores and how scores within this range are represented by different colors, fill patterns, or the like within the treemap). For example, as described above with respect to the actionability input mechanism 715, a higher actionability score may be assigned to after-hours activity where the originator and the receiver are in the same or close time zones as compared to after-hours activity where the originator and the receiver are not in the same time zone or in vastly different time zones. Accordingly, through the color-coding, the GUI 700B represents a novel interface for identifying not only what groupings (for example, organizational groups) are experiencing more after-hours activity than other groupings (for example, by comparing box areas) but also what groupings have opportunities for reduction in after-hours activity based on time differences between originators and receivers.

The GUIs 700A and 700B illustrated in FIGS. 5A and 5B represent example interfaces with example arrangements and formatting of information. Other user interfaces may include similar components in various arrangements and various formats. The types of graphs and selections mechanisms may also vary. Furthermore, in some implementations, when multiple graphs are included within a user interface, one or more graphs may be related. For example, a selection received with respect to one graph may trigger the server 105 to update or generate another graph included in the user interface. However, in other implementations, one or more graphs included in a user interface may not be related. Also, the graphs illustrated in FIGS. 5A and 5B may vary, such as based on filtering criterion selected by a user. For example, FIGS. 6A, 6B, 6C, and 6D illustrate example graphs that may be included in one or more user interfaces generated via the server 105 according to some implementations, including, for example, the user interfaces 700A and 700B described above.

Figure 6A:
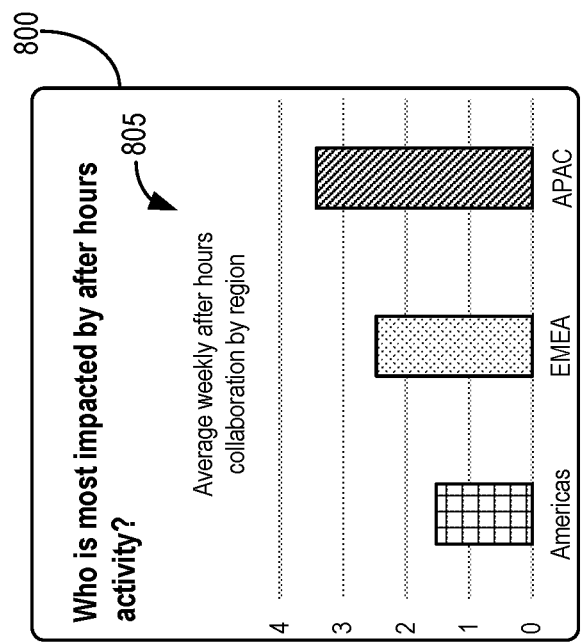
FIGS. 6A, 6B, 6C, and 6D illustrate example graphs included in user interfaces generated via the system of FIG. 1 according to some implementations.

FIG. 6A illustrates a graph panel 800. The graph panel 800 includes a bar graph 805 illustrating after-hours activity experienced by each of a plurality of organizational groups (for example, the top three to five groups). For example, the bar graph 805 shows three regions: Americas, EMEA, and APAC; with APAC having the most after-hours activity of this group (for example, on average per week). Each bar of the bar graph 805 may be selectable to provide further details. For example, in response to receiving a selection of the bar representing APAC, the server 105 may be configured to update the user interface to include data and associated graphics regarding the APAC organizational group. For example, in some implementations, in response to receiving a selection of one of the bars of the bar graph 805, the server 105 is configured to update the user interface to include a graph panel 810 as illustrated FIG. 6B. The graph panel 810 includes a bar graph 815 illustrating topics associated with after-hour activity for a selected group (APAC in the provided example). For example, the bar graph 815 includes bars representing an amount of after-hours activity associated with the topics "weekly stand-up meetings," "cortex," "scrum meetings," and "HH." These topics may be determined from subjects of or keywords included in electronic communications, titles of meetings, or other metadata associated with after-hours activity accessible to the server 105.

As noted above, in some implementations, when a user interface includes multiple graphs and one graph includes information associated with a selection made in another graph, the graph where the selection was made may be modified to indicate the selection. For example, the bar representing APAC in the bar graph 805 may be marked or highlighted (for example, using a different color than the other bars) in response to a user selecting this bar. In some implementations, similar highlighting or marking is also be used to identify highest metrics (of metrics represented within a particular graph) or metrics satisfying one or more thresholds. These markings may allow a user to quickly identify areas where preventive measures or intervention may be needed and avoid wasteful navigation within a user interface and associated computing resources.

Figure 6B:
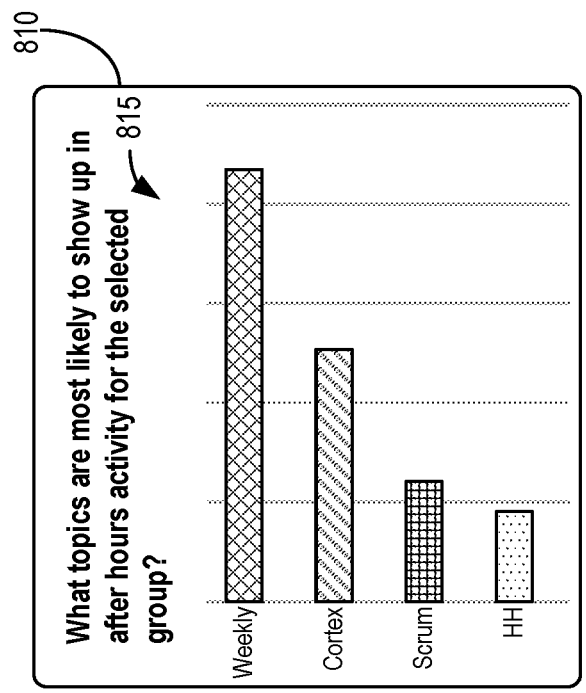
Figure 6C:
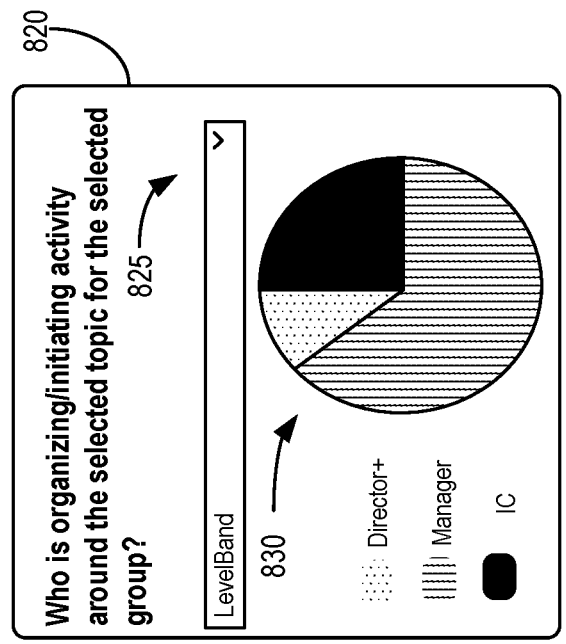

In some implementations, each bar of the bar graph 815 illustrated in FIG. 6B may similarly be selected to provide further details. For example, FIG. 6C includes a graph panel 820 including additional details about levels or roles of users (for example, directors, managers, or the like) who are organizing or otherwise initiating the after-hours activity for the selected topic for the selected group. In some implementations, the graph panel 820 includes an input mechanism 825 for filtering the data included in the panel 820, such as, for example, filtering based on different user levels or roles, different organizational groups, or a combination thereof. As illustrated in FIG. 6C, the graph panel 820 also includes a pie chart 830 illustrating percentages of after-hours activity for the selected group for the selected topic caused by different levels or roles of users.

As noted above, the graphs illustrated in FIGS. 6A-6C may be linked such that a selection in one graph controls the data represented in another graph, wherein received user selections is marked or otherwise indicated within a graph. It will be understood, however, that the graphs illustrated in FIGS. 6A-6C may be provided in separate user interfaces or may be accessed without having to make a selection in a different graph. For example, the graph panel 810 may provide information regarding topics associated with after-hours activity for an entire organization (as compared to a selected organizational group). Similarly, the graph panel 820 may provide information regarding user levels or roles initiating after-hours activity for an entire organization, for all topics, or a combination there (as compared to for providing information for a selected topic and organizational group). In other words, any graph described herein may be provided by the server 105 to provide information at an organizational level, an organizational group level, or with respect to other filtering criterion, which may be received from a user through the user interface via various types of user inputs and selections.

Figure 6D:
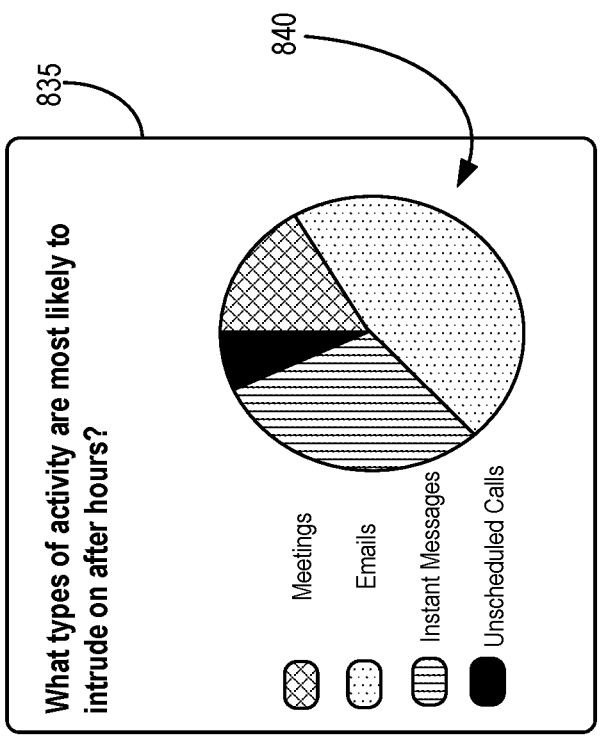

For example, FIG. 6D illustrates a graph panel 835 including details about types of events associated with after-hours activity. As illustrated in FIG. 6D, the graph panel 835 includes a pie chart 840 illustrating what percentage of after-hour activity is caused by meetings, emails, instant messages, and calls (for example, unscheduled calls as a scheduled call may be treated as a meeting as described herein). This information may be provided at the organizational level, an organizational group level, or other received filtering criterion.

To implement the interactive user interfaces described herein, the server 105 (the electronic processor 110 executing the tracking application 208) accesses the event log 112 as described above to determine time information, receiver information, and originator information for each of a plurality of events managed via the electronic communication application. Based on the information stored in the event log, the server 105 generate a multi-dimensional model as described above linking information regarding the plurality of events to organizational data regarding receivers and originators of the plurality of events. The server 105 uses this multi-dimensional model to determine a performed after-hours count representing after-hours activity performed by members of each of a plurality of organizational groups, and to similarly determine, for each of the plurality of organizational groups, a caused after-hours count representing after-hours activity caused by members of each of the plurality of organizational groups as described above.

These determined counts may be included in one or more user interfaces as described above. For example, as illustrated in FIG. 5A, counts of after-hours meetings may be provided for different organizational groups in the bar graph 725 (based on performed after-hours counts) and, in response to receiving a selection of one of the groups in the bar graph 725, the pie graph 750 may be updated to provide information regarding what organizations are causes the after-hours meetings (based on caused after-hours counts).

As noted above, the user interfaces generated via the server 105 may include various input mechanisms (for example, buttons, drop-down menus, sliders, and the like) for receiving filtering criterion. The filtering criterion may include a selected time period, a selected organizational group, and a selected time zone difference (actionability level), a selected organizational group, a selected user role or level, a selected topic, a selected type of activity, or a combination thereof.

In response to receiving filtering criterion through a provided user interface, the server 105 modifies the user interface based on the filtering criterion and the multi-dimensional model. For example, when the filtering criterion includes a selection of an organizational group, updating the graphical user interface may include updating the user interface to include the caused after-hours count for each of a set of organizational groups with respect to the selected organizational group, which the server 105 identifies using the multi-dimensional model. As noted above, the multi-dimensional model allows the server 105 to efficiently (in terms of latency and computing resources) respond to filtering criterion, which results in an improved user experience and user interface (for example, a user may obtain helpful insights through reduced and more efficient and logical inputs or navigation through the user interfaces). Accordingly, the multi-dimensional model allows the server 105 to efficiently respond to filtering criterion and provide filtered and insightful after-hours data through the user interfaces.

In some implementations, in addition to accessing the graphs described herein providing after-hours activity tracking and insights, the user interfaces provided via the server 105 include recommended modifications to the electronic communication application as described above (see method 300). The user interfaces may also include input mechanisms for manually enabling one of the features described above, which again, improves user experiences and reduces a number of navigations, selections, user interfaces, or even applications a user must access to enable or otherwise control a particular function within the electronic communication application. Enabling one of these features through the server 105 may involve modifying a profile of one or more users of the electronic communication application.

The user interfaces described above and the analytics supporting such interfaces allow an organization to track and identify sources of after-hours activity. For example, by selecting data or options within the user interfaces, the server 105 updates the user interfaces to provide data filtered accordingly to various parameters, including user parameters. For example, based on the tracked information (the generated multi-dimensional models), an organization may identify which meetings have the most after-hours impact, which may identify meetings to move or restructure. Similarly, an organization may identify the attributes of users who are attending a particular meeting after hours. These attributes may be used to identify who is being negatively impacted by a meeting, such as, for example, which teams, geographies, levels, or the like. Knowing who these users are and how many users are affected helps an organization understand whether the users' role is critical to the meeting or whether the meeting may be effectively time-shifted. An organization may also identify which users generate the most after-hours time for their colleagues and what are the attributes of these after-hours generators. This information may be used to identify users who many need training or guidance on working hours and after-hours activity. An organization may also identify, for a particular group of after-hours generators, what are the attributes of the users that these generators are negatively impacting. Knowing attributes or parameters of these negatively affected users helps an organization why the generators are reaching out to other users and how that outreach may be adjusted or managed. Organizations may also determine, for a particular group of after-hours generators, what types of events the generators are using (for example, email, instant message, calls, or meetings).

Accordingly, implementations described herein provide systems and methods for tracking after-hours activity via events managed by an electronic communication application to identify an amount of after-hours activity caused by members of an organization. By tracking the source or cause of after-hours activity (as compared to just tracking users working during an after-hours period), an organization may more intelligently and efficiently address unwanted after-hours activity by identifying organizational groups causing after-hours activity and take appropriate action. As described above, in some implementations, operation of the electronic communication application may be modified to prevent or deter members of an identified organizational group from causing further after-hours activity. Furthermore, the systems and methods may provide various user interfaces for analyzing and exploring after-hours activity. For example, leadership within the organization may be able to identify which groups are responsible for the most after-hours activity, and work with these groups to reduce the amount of caused activity. The multi-dimensional model supporting such interfaces allow a user to drill down in tracked activity by various types of receivers, types of originators, types of events, or the like.

Various features and advantages of some implementations are set forth in the following claims.

What is claimed is:

1. A method, comprising:
   accessing a log storing time information, receiver information, and originator information for each of a plurality of events managed via an electronic communication application;
   based on information stored in the log, generating a multi-dimensional model linking information regarding the plurality of events to organizational data regarding receivers and originators of the plurality of events;
   based on the multi-dimensional model, determining, for each of a plurality of organizational groups, a performed after-hours count representing after-hours activity performed by members of each respective organizational group included in the plurality of organizational groups;
   based on the multi-dimensional model, determining, for each of the plurality of organizational groups, a caused after-hours count representing after-hours activity caused by members of each respective organizational group included in the plurality of organizational groups;
   generating a graphical user interface based on the performed after-hours counts and the caused after-hours counts for the plurality of organizational groups; and
   in response to receiving filtering criterion, modifying the graphical user interface based on the filtering criterion and the multi-dimensional model.

2. The method of claim 1, wherein the filtering criterion includes at least one selected from a group consisting of:
   a selected time period;
   a selected organizational group; and
   a selected time zone difference.

3. The method of claim 1, wherein the graphical user interface includes a graph representing the performed after-hours count for each of at least a subset of the plurality of organizational groups.

4. The method of claim 3, wherein the filtering criterion includes a selection of one organizational group from the subset of the plurality of plurality of organizational group and wherein updating the graphical user interface includes updating the graphical user interface to include the caused after-hours count for each of a second subset of the plurality of organizational groups with respect to the one organizational group.

5. The method of claim 1, wherein the graphical user interface includes a graph representing the caused after-hours count for the plurality of organizational groups categorized based on an event type.

6. The method of claim 1, wherein updating the graphical user interface includes grouping, across the plurality of organizational groups, the caused after-hours counts by user level.

7. The method of claim 1, wherein updating the graphical user interface includes grouping, across the plurality of organizational groups, at least one of the performed after-hours count and the caused after-hours count by an event topic.

8. The method of claim 1, the set of functions further comprising modifying operation of the electronic communication application by at least one selected from a group consisting of:
   enabling an after-hours warning feature,
   enabling an after-hours communication delay feature, and
   enabling an after-hours prevention feature.

9. A device, comprising:
   a processor;
   memory in electronic communication with the processor; and
   instructions stored in the memory, the instructions being executable by the processor to:
      access a log storing time information, receiver information, and originator information for each of a plurality of events managed via an electronic communication application;
      based on information stored in the log, generate a multi-dimensional model linking information regarding the plurality of events to organizational data regarding receivers and originators of the plurality of events;
      based on the multi-dimensional model, determine, for each of a plurality of organizational groups, a performed after-hours count representing after-hours activity performed by members of each respective organizational group included in the plurality of organizational groups;
      based on the multi-dimensional model, determine, for each of the plurality of organizational groups, a caused after-hours count representing after-hours activity caused by members of each respective organizational group included in the plurality of organizational groups;
      generate a graphical user interface based on the performed after-hours counts and the caused after-hours counts for the plurality of organizational groups; and
      in response to receiving filtering criterion, modify the graphical user interface based on the filtering criterion and the multi-dimensional model.

10. The device of claim 9, wherein the filtering criterion includes at least one selected from a group consisting of:
   a selected time period;
   a selected organizational group; and
   a selected time zone difference.

11. The device of claim 9, wherein the graphical user interface includes a graph representing the performed after-hours count for each of at least a subset of the plurality of organizational groups.

12. The device of claim 11, wherein the filtering criterion includes a selection of one organizational group from the subset of the plurality of plurality of organizational group and wherein updating the graphical user interface includes updating the graphical user interface to include the caused after-hours count for each of a second subset of the plurality of organizational groups with respect to the one organizational group.

13. The device of claim 9, wherein the graphical user interface includes a graph representing the caused after-hours count for the plurality of organizational groups categorized based on an event type.

14. The device of claim 9, wherein the instructions are further executable by the processor to update the graphical user interface by grouping, across the plurality of organizational groups, the caused after-hours counts by user level.

15. The device of claim 9, wherein the instructions are further executable by the processor to update the graphical user interface by grouping, across the plurality of organizational groups, at least one of the performed after-hours count and the caused after-hours count by an event topic.

16. The device of claim 9, the set of functions further comprising modifying operation of the electronic communication application by at least one selected from a group consisting of:
   enabling an after-hours warning feature,
   enabling an after-hours communication delay feature, and
   enabling an after-hours prevention feature.

17. Non-transitory computer-readable medium storing instructions that, when executed by an electronic processor, perform a set of functions, the set of functions comprising:
   accessing a log storing time information, receiver information, and originator information for each of a plurality of events managed via an electronic communication application;
   based on information stored in the log, generating a multi-dimensional model linking information regarding the plurality of events to organizational data regarding receivers and originators of the plurality of events;
   based on the multi-dimensional model, determining, for each of a plurality of organizational groups, a performed after-hours count representing after-hours activity performed by members of each respective organizational group included in the plurality of organizational groups;
   based on the multi-dimensional model, determining, for each of the plurality of organizational groups, a caused after-hours count representing after-hours activity caused by members of each respective organizational group included in the plurality of organizational groups;
   generating a graphical user interface based on the performed after-hours counts and the caused after-hours counts for the plurality of organizational groups; and
   in response to receiving filtering criterion, modifying the graphical user interface based on the filtering criterion and the multi-dimensional model.

18. The non-transitory computer-readable medium of claim 17, wherein updating the graphical user interface includes grouping, across the plurality of organizational groups, the caused after-hours counts by user level.

19. The non-transitory computer-readable medium of claim 17, wherein updating the graphical user interface includes grouping, across the plurality of organizational groups, at least one of the performed after-hours count and the caused after-hours count by an event topic.

20. The non-transitory computer-readable medium of claim 17, the set of functions further comprising modifying operation of the electronic communication application by at least one selected from a group consisting of:
   enabling an after-hours warning feature,
   enabling an after-hours communication delay feature, and
   enabling an after-hours prevention feature.

* * * * *